United States Patent
Hu et al.

(10) Patent No.: US 10,432,405 B1
(45) Date of Patent: Oct. 1, 2019

(54) SYSTEMS AND METHODS FOR ACCELERATING TRANSACTION VERIFICATION BY PERFORMING CRYPTOGRAPHIC COMPUTING TASKS IN PARALLEL

(71) Applicant: Accelor Ltd., Grand Cayman (KY)

(72) Inventors: Shiwen Hu, Sunnyvale, CA (US);
Xiaohan Ma, Santa Clara, CA (US);
Guojun Chu, Saratoga, CA (US)

(73) Assignee: Accelor Ltd., Grand Cayman (KY)

( * ) Notice: Subject to any disclaimer, the term of this patent is extended or adjusted under 35 U.S.C. 154(b) by 0 days.

(21) Appl. No.: 16/122,406

(22) Filed: Sep. 5, 2018

(51) Int. Cl.
| H04L 29/06 | (2006.01) |
| H04L 9/32 | (2006.01) |
| H04L 9/06 | (2006.01) |
| H04L 29/08 | (2006.01) |

(52) U.S. Cl.
CPC .......... *H04L 9/3247* (2013.01); *H04L 9/0637* (2013.01); *H04L 9/3242* (2013.01); *H04L 67/10* (2013.01); *H04L 2209/125* (2013.01); *H04L 2209/38* (2013.01)

(58) Field of Classification Search
CPC ... H04L 9/3247; H04L 9/3242; H04L 9/0637; H04L 67/10; H04L 2209/125; H04L 2209/38
See application file for complete search history.

(56) References Cited

U.S. PATENT DOCUMENTS

| 3,582,908 A | 6/1971 | Koo |
| 3,641,516 A | 2/1972 | Castrucci et al. |
| 6,134,676 A | 10/2000 | VanHuben |

(Continued)

FOREIGN PATENT DOCUMENTS

| JP | 08-297567 A | 11/1996 |
| WO | 2017/207717 A1 | 12/2017 |

OTHER PUBLICATIONS

Zsolt István et al., Consensus in a Box: Inexpensive Coordination in Hardware, USENIX Association, 13th USENIX Symposium on Networked Systems Design and Implementation (NSDI '16), Mar. 16-18, 2016 (15 pages).

(Continued)

*Primary Examiner* — Mahfuzur Rahman
(74) *Attorney, Agent, or Firm* — Sheppard Mullin Richter & Hampton LLP (57) ABSTRACT

Systems and methods related to processing transaction verification operations in decentralized applications via a fixed pipeline hardware architecture are described herein. The fixed pipeline hardware architecture may include and/or support at least a crypto engine and a read set validation engine. The crypto engine may itself comprise a hardware architecture configured to perform cryptographic operations necessary to validate signatures for transactions in decentralized applications. In various implementations, the hardware architecture of a crypto engine may include a scheduler and a series of crypto execution units configured to operate in parallel. The scheduler may be configured to decode an algorithm associated with cryptographic signatures to be verified and coordinate the performance of various cryptographic operations amongst individual cryptographic execution units.

19 Claims, 6 Drawing Sheets

(56) References Cited

U.S. PATENT DOCUMENTS

| | | | |
|---|---|---|---|
| 6,138,228 A | 10/2000 | Douady | |
| 6,724,394 B1 | 4/2004 | Zatz | |
| 7,599,491 B2 | 10/2009 | Lambert | |
| 7,979,569 B2 | 7/2011 | Eisner et al. | |
| 8,280,048 B2 | 10/2012 | Lambert | |
| 8,621,239 B2 | 12/2013 | Lambert | |
| 8,675,869 B2 | 3/2014 | Little et al. | |
| 8,782,434 B1 | 7/2014 | Ghose | |
| 8,972,738 B2 | 3/2015 | Little et al. | |
| 2004/0060032 A1* | 3/2004 | McCubbrey | G06F 17/5054 716/104 |
| 2010/0325419 A1 | 12/2010 | Kanekar | |
| 2011/0271007 A1* | 11/2011 | Wang | H04L 45/306 709/238 |
| 2015/0332283 A1 | 11/2015 | Witchey | |
| 2016/0070700 A1 | 3/2016 | Biswas | |
| 2016/0125040 A1 | 5/2016 | Kheterpal | |
| 2017/0083998 A1* | 3/2017 | Acharya | G06T 1/60 |
| 2017/0206382 A1 | 7/2017 | Rodriguez De Castro | |
| 2017/0212781 A1 | 7/2017 | Dillenberger | |
| 2017/0244720 A1 | 8/2017 | Kurian et al. | |
| 2017/0300978 A1 | 10/2017 | Narasimhan | |
| 2017/0331896 A1 | 11/2017 | Holloway et al. | |
| 2018/0006808 A1 | 1/2018 | Suresh | |
| 2018/0145836 A1 | 5/2018 | Saur et al. | |
| 2018/0181309 A1 | 6/2018 | Miyamae et al. | |
| 2018/0217942 A1* | 8/2018 | Fons | G06F 12/1408 |
| 2018/0219671 A1 | 8/2018 | Velissarios et al. | |
| 2018/0219685 A1 | 8/2018 | Deery | |
| 2018/0227293 A1 | 8/2018 | Uhr | |
| 2018/0247376 A1 | 8/2018 | Sharma et al. | |
| 2018/0248880 A1 | 8/2018 | Sardesai et al. | |
| 2018/0287915 A1* | 10/2018 | Smith | H04L 43/0817 |

OTHER PUBLICATIONS

Xiaoqi Li et al, "A survey on the security of blockchain systems", *Future Generation Computer Systems*, Aug. 23, 2017, 13 pages.

Lian Yu et al, "Smart-Contract Execution with Concurrent Block Building", 2017 *IEEE Symposium on Service-Oriented System Engineering (SOSE)*, IEEE, 2017, pp. 160-167.

Non-Final Office Action dated Dec. 11, 2018, issued in related U.S. Appl. No. 16/122,257 (13 pages).

Notice of Allowance dated Feb. 12, 2019, issued in related U.S. Appl. No. 16/160,161 (11 pages).

U.S. Appl. No. 16/188,783, filed Nov. 13, 2018.

U.S. Appl. No. 16/236,243, filed Dec. 28, 2018.

* cited by examiner

SYSTEMS AND METHODS FOR ACCELERATING TRANSACTION VERIFICATION BY PERFORMING CRYPTOGRAPHIC COMPUTING TASKS IN PARALLEL

FIELD OF THE INVENTION

The invention relates to systems and methods for processing transaction verification operations in decentralized applications via a fixed pipeline hardware architecture.

BACKGROUND OF THE INVENTION

Decentralized applications are applications that run on peer-to-peer networks, rather than on a single computer. Transactions associated with decentralized applications are typically processed by nodes (or computers) on the peer-to-peer network based on trustless protocols or a series of validation rules established by the creators of the decentralized application. A critical component of decentralized applications is the manner in which transactions associated with the decentralized application are verified and recorded.

In many decentralized applications, verified transactions are committed to a blockchain. Many types of blockchains exist. In general, they are distributed ledgers shared by the nodes on a network to which transactions are recorded and validated. A block is a part of a blockchain, which records some or all of the recent transactions. Once completed, a block is stored in the blockchain as a permanent database. Each time a block gets completed, a new one is generated. Each block in the blockchain is connected to the others (like links in a chain) in proper linear, chronological order. Every block contains a hash of the previous block. The blockchain has information about different user addresses and their balances right from the genesis block to the most recently completed block.

Recent advances in decentralized applications have enabled high-throughput transaction processing speed. Conventionally, increased throughput transaction processing speed has been achieved via software stack development and/or protocol consolidation. However, many of the operations required to verify transactions are computationally intensive. As a result, users in decentralized applications may be incentivized to skip verification operations to preserve computational resources and apply them in a manner that may benefit them financially, but also create security concerns and limit the scalability of the decentralized application. This is sometimes referred to as the "verifier's dilemma." It would be desirable to provide systems and methods that encompass a hardware solution to the verifier's dilemma by facilitating increased throughput transaction processing speed in decentralized application via a fixed pipeline hardware architecture.

Furthermore, performing the necessary cryptographic operations to verify a transaction in decentralized applications places extreme demand on processors in a computer system. To meet these demands, dedicated hardware units may be used to perform various operations associated with a cryptography algorithm. These units may include various integer and floating point arithmetic operations, bitwise logic operations, and/or comparison operations. The rapid evolution of blockchain applications is expected to require high-performance cryptographic operations to be performed on numerous transitions and/or blocks, contributing to the difficulty and cost associated with units designed for blockchain transaction verification. It would be desirable to provide systems and methods that encompass a hardware solution that requires reduced chip area and can be used more efficiently to perform required cryptographic operations.

SUMMARY OF THE INVENTION

The systems and methods described herein relate to a fixed pipeline hardware architecture configured to process transaction verification operations for decentralized applications. The fixed pipeline hardware architecture may comprise and/or be incorporated within a self-contained hardware device comprising electronic circuitry configured to be communicatively coupled or physically attached to a component of a computer system. The fixed pipeline hardware architecture may include and/or support at least a high-speed direct memory access (DMA) configured to access a ledger stored in local memory, a crypto engine, a read set validation engine, and/or one or more other components, engines, or modules configured to accelerate the transaction verification process. In some implementations, the fixed pipeline architecture may include multiple crypto engines and/or multiple read set validation engines based on performance, cost, or power tradeoffs.

The crypto engine may itself comprise a hardware architecture configured to perform cryptographic operations necessary to validate signatures for transactions in decentralized applications. For example, the one or more cryptographic operations may comprise crypto signature generation (encrypt) operations and crypto signature verification (decrypt) operations. In various implementations, the hardware architecture of a crypto engine may include a scheduler and a parallel cryptographic execution array comprising a set of cryptographic execution units configured to operate in parallel. Each cryptographic execution unit in the parallel cryptographic execution array may be configurable to support a vast number of operations including multiply-add, logic, integer and floating-point arithmetic operations. The cryptographic execution unit may share resources in an effort to reduce chip area, and the highly-parallel nature in which the cryptographic execution units are able to operate increases the efficiency with which cryptographic signatures are verified for decentralized applications.

In various implementations, each of the cryptographic execution units may be configured to perform one of more specific cryptographic operations or types of cryptographic operations independently. Because each of the cryptographic execution units may be associated with one or more cryptographic operations, the cryptographic execution units may be configurable for different decentralized applications. The scheduler may be configured to identify the cryptographic operations required to authenticate one or more cryptographic signatures and dispatch tasks related to the signatures among the series of cryptographic execution units.

The scheduler and parallel cryptographic execution array may each interface with one or more data buffers that increase the efficiency with which cryptographic operations are performed. For example, scheduler may be configured to identify the cryptographic operations required to authenticate one or more cryptographic signatures based on the parameters associated with the algorithm for the cryptographic signatures. While the algorithm and/or its parameters may be provided to scheduler, other data (such as hash values and public and private keys) may be cached in a software-managed data buffer such that it may later be access by the parallel cryptographic execution array once cryptographic operations have been distributed amongst the individual cryptographic execution units.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The systems and methods described herein related to a fixed pipeline hardware architecture configured to process transaction verification operations in decentralized applications. The fixed pipeline hardware architecture may include and/or support at least a crypto engine and a read set validation engine. The crypto engine may itself comprise a hardware architecture configured to perform cryptographic operations necessary to validate signatures for transactions in decentralized applications. In various implementations, the hardware architecture of a crypto engine may include a scheduler and a series of crypto execution units configured to operate in parallel. The scheduler may be configured to decode an algorithm associated with cryptographic signatures to be verified and coordinate the performance of various cryptographic operations amongst individual cryptographic execution units.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
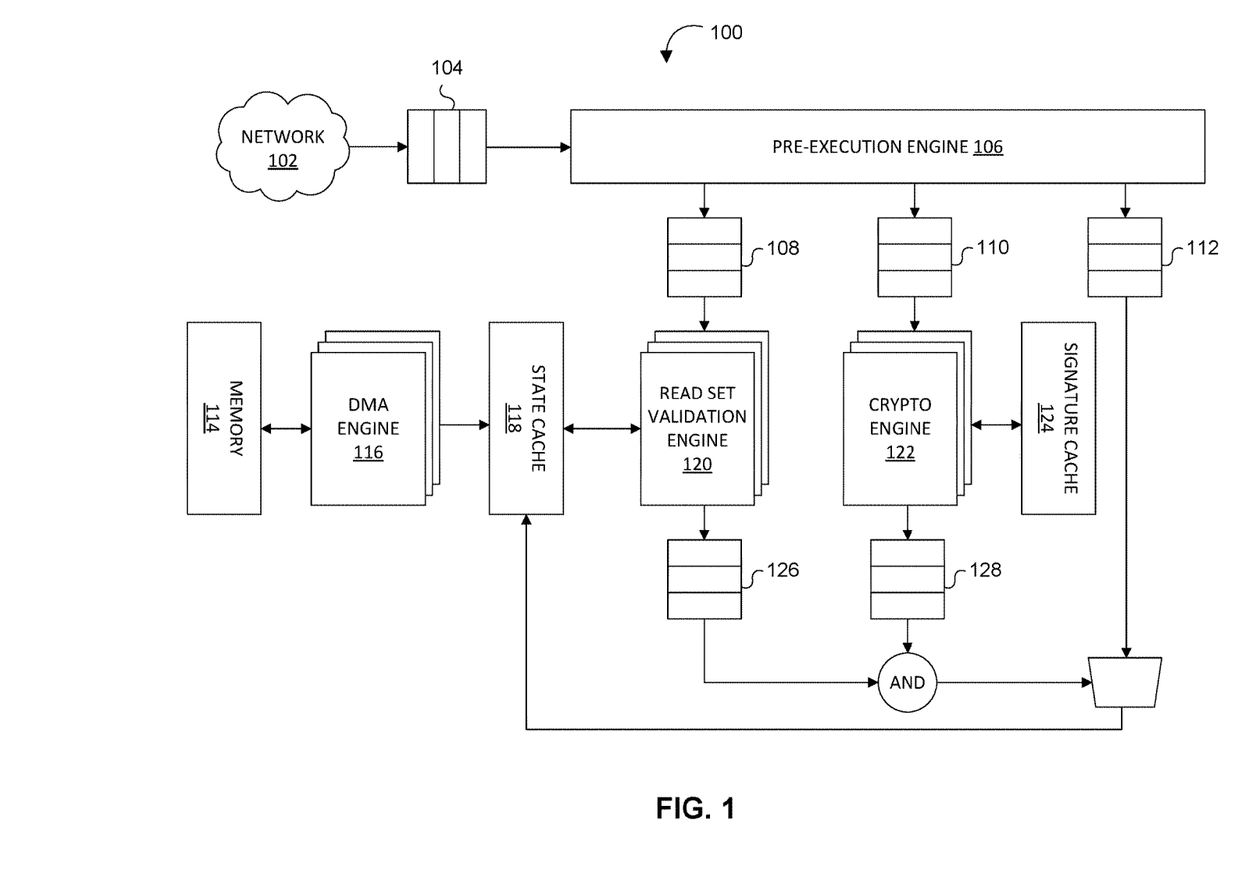
FIG. 1 depicts a block diagram of an example of a system configured to process transaction verification operations in decentralized applications, in accordance with one or more implementations of the invention.

FIG. 1 depicts a block diagram of an example of a system 100 configured to process transaction verification operations in decentralized applications, in accordance with one or more implementations of the invention. In various implementations, system 100 may comprise a hardware device. In some implementations, system 100 may comprise a single self-contained hardware device configured to be communicatively coupled or physically attached to a component of a computer system. In an exemplary implementation, system 100 may comprise electronic circuitry and/or a printed circuit board that can be inserted into an electrical connector or expansion slot of a computer system. For example, system 100 may comprise an expansion card, expansion board, adapter card, or accessory card configured to accelerate the transaction verification process. In some implementations, system 100 may comprise an application specific integrated circuit (ASIC) or a field-programmable gate array (FPGA) configured to perform transaction verification operations associated with one or more decentralized applications.

System 100 may include one or more hardware components. In various implementations, the one or more hardware components of system 100 may include an incoming block buffer 104, a pre-execution engine 106, a read set holding buffer 108, a signature validation buffer 110, a write set holding buffer 112, local memory 114, a DMA engine 116, a state cache 118, a read set validation engine 120, a crypto engine 122, a signature cache 124, a read set validation result buffer 126, a signature validation result buffer 128, and/or other components. In various implementations, the one or more hardware components of system 100 may form a fixed pipeline hardware architecture configured to accelerate the transaction verification process. For example, the one or more hardware components may configure system 100 to verify the authenticity of transactions in a block, check the validity of the transactions, and/or commit (or write) the block and the validation results onto the blockchain.

System 100 may be configured to accelerate the verification of transactions received via network 102. System 100 may be configured to receive a block comprising a set of transactions via network 102. In various implementations, incoming block buffer 104 may be configured to cache the received block. In some implementations, incoming block buffer 104 may be configured to cache the received block prior to pre-execution of the received block.

In various implementations, system 100 may include a pre-execution engine 106. Pre-execution engine 106 may be configured to conduct pre-execution of new transactions while a new block is being created. By pre-executing the transaction validations, pre-execution engine 106 may significantly reduce the latency of a transaction's life cycle and greatly improve the throughput of a computer system to which system 100 is communicatively coupled and/or physically attached.

Blocks received and cached in incoming block buffer 104 may be inserted into one of a set of queues. A block comprising a set of transactions may include a ledger reading set, cryptographic signatures to be authenticated, and a ledger writing set. In various implementations, the ledger reading set of an incoming block may be inserted into read set holding buffer 108, cryptographic signatures of an incoming block to be authenticated may be inserted into signature validation buffer 110, and the ledger writing set of an incoming block may be inserted into write set holding buffer 112. In order for a transaction to be validated, both the ledger reading set and cryptographic signatures must be valid. If valid, the ledger writing set is applied to the global state (as described further herein). If not valid, the ledger writing set will not be applied to the global state. All valid information for a transaction is saved and committed (written) into the blockchain.

In various implementations, system 100 may include one or more of read set validation engine 120 and crypto engine 122. Accordingly, system 100 may include multiple read set validation engines 120 and/or multiple crypto engines 122. In some implementations, system 100 may include multiple read set validation engines 120 and/or multiple crypto engines 122 based on performance tradeoffs, cost tradeoffs, and/or power tradeoffs. As such, system 100 may be configurable based on the number of read set validation engines 120 and/or crypto engines 122 contained therein.

Each read set validation engine 120 may be configured to fetch ledger data and validate the ledger reading set against the global state. The global state may refer to the current status related to one or more data points in a verified ledger written to the blockchain. In various implementations, read set validation engine 120 may be configured to receive the ledger reading set of an incoming block from read set holding buffer 108. Read set validation engine 120 may be configured to interface with state cache 118 to obtain and cache data required to validate ledger reading set against the global state. In various implementations, the results of the ledger reading set validation by read set validation engine 120 may be cached in read set validation result buffer 126 at least until they are compared to results of the signature validation by crypto engine 122. Read set validation engine 120 is further described herein in connection with FIG. 2.

Each crypto engine 122 may comprise one or more cryptographic functional units. Each cryptographic functional unit may comprise a core configured to perform one or more cryptographic operations required to verify the authenticity of transactions in a block. For example, the one or more cryptographic operations may comprise crypto signature generation (encrypt) operations and crypto signature verification (decrypt) operations. In various implementations, crypto engine 122 may be configured to receive cryptographic signatures of a block to be authenticated from signature validation buffer 110. Crypto engine 122 may be configured to interface with signature cache 124 to obtain and cache data required to authenticate cryptographic signatures associated with a transaction. In various implementations, the results of the signature validation by crypto engine 122 may be cached in signature validation result buffer 128 at least until they are compared to results of the read set validation by read set validation engine 120. Crypto engine 122 is further described herein in connection with FIG. 3.

In various implementations, system 100 may comprise a direct memory access (DMA) engine 116. DMA engine 116 may be configured to fetch data required to verify the authenticity and read set data of a transaction. For example, DMA engine 116 may be configured to fetch existing blocks and signatures accessed by a transaction. In various implementations, DMA engine 116 may be configured to access a ledger in memory required to validate data associated with a transaction. For example, DMA engine 116 may be configured to access local memory 114 to obtain a ledger required to validate data associated with a transaction.

In various implementations, read set validation result buffer 126 may comprise a cache of results of the ledger reading set validation by read set validation engine 120 and signature validation result buffer 128 may comprise a cache of the results of the signature validation by crypto engine 122.

In various implementations, system 100 may be configured to compare the results of the ledger reading set validation cached in read set validation result buffer 126 and the results of the signature validation cached in signature validation result buffer 128. Regardless of the results of the ledger reading set validation and the results of the signature validation or the comparison thereof, system 100 is configured to commit (or write) the transaction to the blockchain. However, based on the comparison of the results of the ledger reading set validation and the results of the signature validation, system 100 may also write the transaction to the state cache and update the global state based on the transaction. Specifically, if both the ledger reading set and the cryptographic signatures are valid, system 100 may be configured to write the transaction to the state cache and update the global state based on the transaction. In order to update the global state based on the transaction, the ledger writing set is applied to the global state. For example, if system 100 determines that both the ledger reading set and the cryptographic signatures are valid for a given transaction, a ledger writing set associated with that transaction cached in write set holding buffer 112 may be applied to the global state to update the global state based on the transaction. If either the ledger reading set or the cryptographic signatures are invalid, system 100 is specifically configured to not update the global state based on the transaction. If the ledger reading set is not valid, it may be due to the fact that there are insufficient funds to process the transaction or that the ledger reading set otherwise indicates that one or more conditions associated with the transaction have not been satisfied. Accordingly, system 100 will not process the transaction by updating the global state. Similarly, if the cryptographic signatures are invalid, it may be indicate a potential hack has occurred. Accordingly, system 100 will not process the potentially fraudulent transaction by updating the global state.

Read Set Validation

Figure 2:
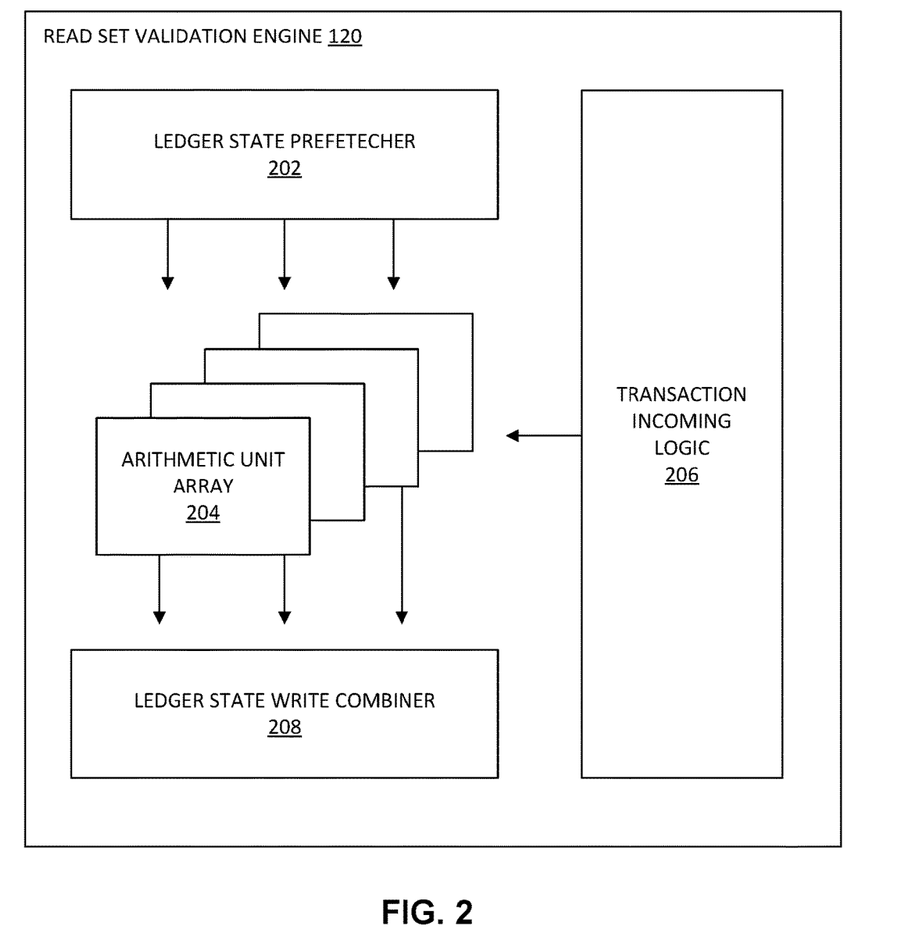
FIG. 2 illustrates a block diagram of an example of a read set validation engine configured to fetch ledger data and validate the ledger reading set against the global state, in accordance with one or more implementations of the invention.

FIG. 2 illustrates a block diagram of an example of read set validation engine 120 configured to fetch ledger data and validate the ledger reading set against the global state, in accordance with one or more implementations of the invention. Read set validation engine 120 may comprise an architecture configured to validate read set data by determining whether a global state satisfies the current requirements of a transaction. In various implementations, one or more hardware components of read set validation engine 120 may form a fixed pipeline hardware architecture configured to fetch ledger data and validate the ledger reading set against the global state for a given transaction. In various implementations, the one or more hardware components of read set validation engine 120 may include a ledger state prefetcher 202, an arithmetic unit array 204, transaction incoming logic 206, a ledger state write combiner 208, and/or one or more other components. Read set validation engine 120 may be configured to obtain data necessary to validate the ledger reading set against the global state from local memory (such as memory 114 and/or state cache 118). In various implementations, read set validation engine 120 may include an input interface from DMA. For example, read set validation engine 120 may include an input interface from DMA engine 116.

In various implementations, read set validation engine 120 may comprise a ledger state prefetcher 202 configured to fetch data required by read set validation engine 120. In some implementations, ledger state prefetcher 202 may be configured to fetch a ledger state from state cache 118. In some implementations, ledger state prefetcher 202 may be configured to fetch a ledger state from state cache 118 via a high-speed memory interface. In some implementations, ledger state prefetcher 202 may be configured to prefetch a ledger state from state cache 118. Fetching from local memory would require accessing the entire memory, which would slow down throughput speed in the read set validation engine. Prefetching the ledger state from state cache 118 (which is local memory) would provide read set validation engine 120 with data from local memory without having to access the entire local memory for each computation. In various implementations, read set validation engine 120 may include transaction incoming logic 206 configured to extract state information from an incoming transaction. Accordingly, ledger state prefetcher 202 may be configured to obtain a local state from memory and transaction incoming logic 206 may be configured to obtain an incoming transaction state from the transaction data.

In various implementations, read set validation engine 120 may include arithmetic unit array 204 configured to perform a read set comparison against pre-executed results. In various implementations, arithmetic unit array 204 may be configured to perform computing tasks to verify transactions. In some implementations, arithmetic unit array 204 may be configured to operate in parallel. In other words, arithmetic unit array 204 may be configured to perform parallel processing of validation compute tasks for different transactions simultaneously. In various implementations, arithmetic unit array 204 may be configured to verify that a local copy of a state (obtained from memory) and the incoming transaction state match.

In various implementations, read set validation engine 120 may include ledger state write combiner 208 configured to perform a burst write for transaction results to the resulting buffer (i.e., read set validation result buffer 126). If an incoming transaction is validated (if the local copy of a state and the incoming transaction state match), ledger state write combiner 208 may be configured to combine states together and write to read set validation result buffer 126.

In an exemplary implementation in which a decentralized application involves a banking institution, each of the bank customers with an account may have their account written to a blockchain. Accordingly, the current status of each account and a history of every transaction involving each account is written to the blockchain, and the current status of each account would comprise the global state. In this exemplary implementation, system 100 may be configured to verify a block comprising a set of transactions involving bank customers. Transaction incoming logic 206 may be configured to obtain an incoming transaction state from the transaction data. For example, transaction incoming logic 206 may be configured to determine that a transaction involving a first bank customer involves a stock purchase for $3,000 and a transaction involving a second bank customer involves a transfer of $4,000. Read set validation engine 120 may be configured to obtain from memory (e.g., memory 114) a local state. The local state may comprise the global state indicating that a current account of the first customer comprises $2,000 and that a current account of the second customer comprises $8,000. Read set validation engine 120 may be configured to determine whether the current state meets the requirements for a given transaction. For example, arithmetic unit array 204 may be configured to compare the local state of the first customer (i.e., $2,000) and the incoming transaction state for the transaction involving the first customer (i.e., a transaction requiring $3,000), and compare the local state of the second customer (i.e., $8,000) and the incoming transaction state for the transaction involving the second customer ($4,000). Accordingly, read set validation engine 120 may be configured to determine that the transaction involving the first bank customer is invalid and that the transaction involving the second bank customer is valid.

In various implementations, the results of the ledger reading set validation by read set validation engine 120 may be cached in read set validation result buffer 126. For example, an indication that the transaction involving the first customer is invalid and an indication that the transaction involving the second customer is valid may be cached in read set validation result buffer 126. In various implementations, the results of the ledger reading set validation (i.e., the indication that the transaction involving the first customer is invalid and the indication that the transaction involving the second customer is valid) may be cached in read set validation result buffer 126 at least until they are compared to the results of the signature validation by crypto engine 122.

Cryptographic Signature Validation

Figure 3:
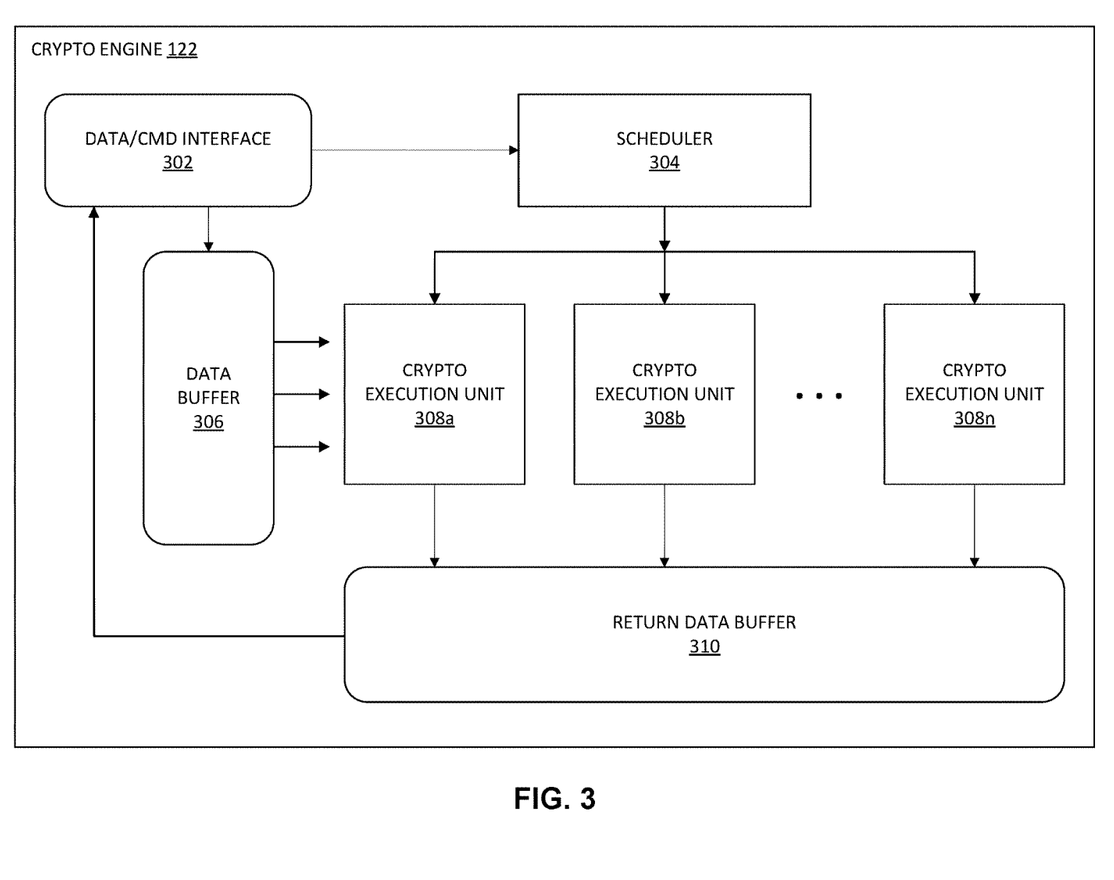
FIG. 3 illustrates a block diagram of an example of a crypto engine configured to perform one or more cryptographic operations required to verify the authenticity of transactions in a block, in accordance with one or more implementations of the invention.

FIG. 3 illustrates a block diagram of an example of crypto engine 122 configured to perform one or more cryptographic operations required to verify the authenticity of transactions in a block, in accordance with one or more implementations of the invention. Crypto engine 122 may comprise an architecture configured to perform necessary cryptographic operations. In various implementations, one or more hardware components of crypto engine 122 may form a fixed pipeline hardware architecture configured to perform necessary cryptographic operations. In various implementations, the one or more hardware components of crypto engine 122 may include a data/CMD interface 302, a scheduler 304, a data buffer 306, one or more crypto execution units 308 (308a, 308b, . . . , 308n), a return data buffer 310, and/or one or more other components. In some implementations, crypto engine 122 may include multiple crypto execution units. For example, crypto engine 122 may include n-number of crypto execution units 308 wherein "n" is any number greater than 1. Crypto execution units 308 are also referred to herein as cryptographic execution units.

Cryptographic operations are implemented in system 100 via a highly-parallel architecture. In various implementations, crypto engine 122 may include multiple crypto execution units 308 configured to operate in parallel. In various implementations, crypto engine 122 may include multiple crypto execution units 308 configured to form a parallel cryptographic execution array. In various implementations, each individual crypto execution unit 308 is coupled to one or more other crypto execution units and is configured to share hardware resources with one or more other crypto execution units. For example, an individual crypto execution unit 308 may be configured to share a random number generator (e.g., shared random number generator 408) with one or more other crypto execution units. Other resources may be dedicated to individual crypto execution units. For example, one or more hardware resources (e.g., hashing and table lookup) may be dedicated to individual crypto execution units (e.g., crypto execution unit 308).

In various implementations, data required by one or more crypto execution units 308 may be obtained via data buffer 306. Data buffer 306 may be configured to cache data required to perform cryptographic operations related to authenticate cryptographic signatures for a block comprising a set of transactions. For example, data buffer 306 may be configured to cache algorithm parameters required to verify a cryptographic signature, hash values (e.g., hash public key and hash private key), and other data written to a block comprising a set of transactions crypto engine 122 is tasked to verify. In various implementations, data buffer 306 may be software-managed. In some implementations, data buffer 306 may be partitioned into different physical regions and each physical region may be associated with one or more different transactions. For example, each transaction may be assigned or be associated with a specific transaction ID. Each partitioned physical region of data buffer 306 may be associated with one or more specific transaction IDs. The partitioned nature of data buffer 306 enables information needed by the individual crypto execution units 308 to be easily accessed based on the transaction ID.

In various implementations, data buffer 306 may be configured to provide parameters to scheduler 304 to enable scheduler 304 to determine the type of algorithm required to authenticate a cryptographic signature, but withhold hash values that are much larger in size and are not required by scheduler 304 to make the foregoing determination. For example, hash values may comprise 512 bits, public keys and/or private keys may comprise 256 bits, and cryptographic algorithm parameters may comprise 256 bits. Scheduler 304 may be configured to determine cryptographic operations required to authenticate a cryptographic signature using only the cryptographic algorithm parameters. Data buffer 306 may obtain data via data/CMD interface 302. Data/CMD interface 302 may comprise a high-speed and/or high-bandwidth interface. For example, data/CMD interface 302 may comprise a PCIe electrical interface or an Ethernet networking interface. In some implementations, data buffer 306 may be configured to prefetch transaction data, signatures, private keys, and/or other information associated with transactions to be verified. Once a cryptographic operation has been dispatched to a specific crypto execution unit 308, that crypto execution unit 308 may be configured to access the required information to perform the cryptographic operation from data buffer 306.

In various implementations, scheduler 304 may be configured to identify the cryptographic operations required to authenticate one or more cryptographic signatures and dispatch tasks related to the cryptographic signatures to at least one of the one or more crypto execution units 308. Each cryptographic operation may require a specific algorithm. For example, the cryptographic operation may require the elliptic curve digital signature algorithm (ECDSA), the ECDH algorithm, the RSA algorithm, the ASE algorithm, the zk-SNARKs algorithms, and/or one or more other specific algorithms. Each algorithm may have different priorities and/or parameters. In various implementations, scheduler 304 may be configured to identify the algorithmic parameters associated with one or more cryptographic signatures. In various implementations, scheduler 304 may be configured to determine the type of algorithm required to authenticate a cryptographic signature and the relevant parameters, and dispatch the cryptographic signature to one of the one or more crypto execution units 308 based on the determination. In various implementations, scheduler 304 may be configured to determine the cryptographic operations required to authenticate one or more cryptographic signatures without accessing the hash values for the individual cryptographic signatures. In other words, scheduler 304 may be configured to determine the cryptographic operations required to authenticate one or more cryptographic signatures with only the algorithm and parameters associated with a given cryptographic signature to be verified.

In various implementations, scheduler 304 may be configured to cooperate with one or more software layers to support non-blocking transition cryptographic operations. For example, scheduler 304 may cooperate with one or more software layers to meet the demands of decentralized applications in which one or more transitions in a particular channel have a higher priority over other blocks. In some implementations, the one or more software layers may include a credit-control mechanism. The credit-control mechanism may comprise software configured to obtain an indication of the hardware limits and capabilities of system 100 and crypto execution units 308 in crypto engine 122 and verify that the number of transactions being processed does not exceed the hardware limits and capabilities of system 100 or crypto execution units 308. In some implementations, the credit-control mechanism may be configured to limit the number of transactions processed by system 100 at a given time to ensure the number of transactions being processed by system 100 does not exceed the hardware limits and capabilities of system 100. In some implementations, scheduler 304 may interface with the credit-control mechanism to limit the number of cryptographic operations being routed to individual crypto execution units 308 at a given time to ensure the number of cryptographic tasks being routed to individual crypto execution units 308 does not exceed the hardware limits and capabilities of system 100.

Figure 4:
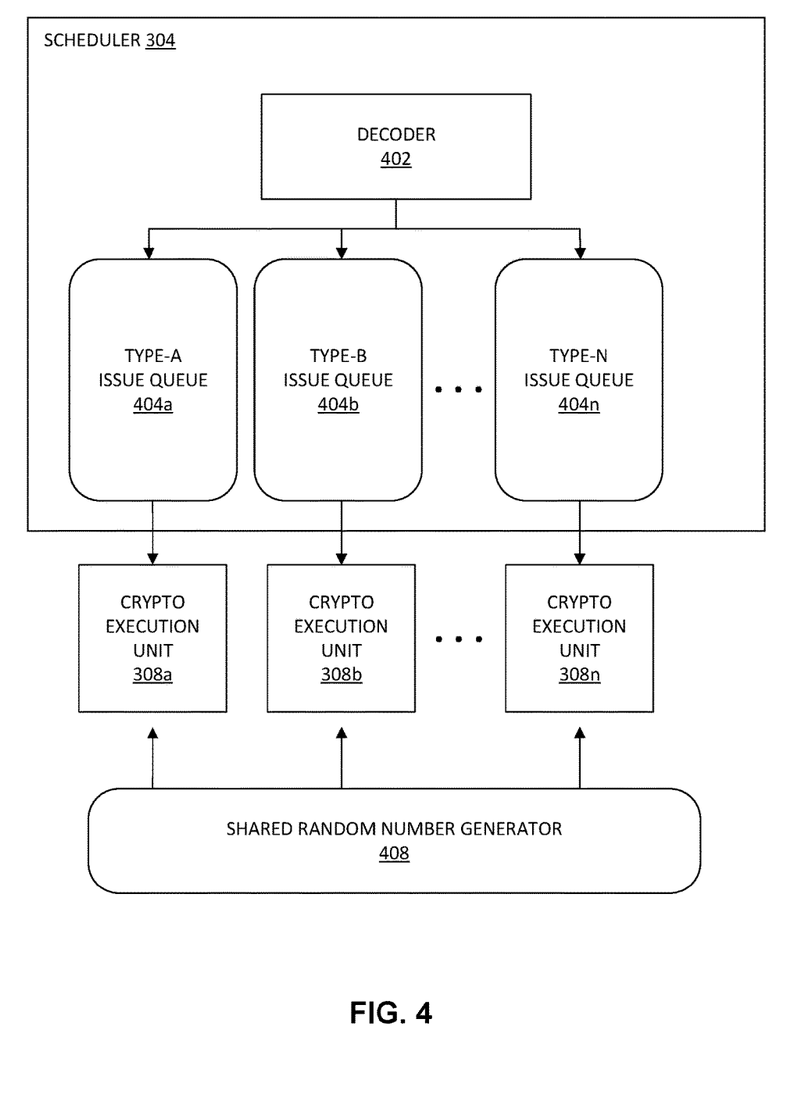
FIG. 4 illustrates a block diagram of micro-architecture of a scheduler configured to identify the cryptographic operations required to authenticate one or more cryptographic signatures and coordinate tasks related to the cryptographic signatures to be performed by an array of crypto execution units, in accordance with one or more implementations of the invention.

For example, FIG. 4 illustrates a block diagram of microarchitecture of scheduler 304 configured to identify the cryptographic operations required to authenticate one or more cryptographic signatures and coordinate tasks related to the cryptographic signatures to be performed by an array of crypto execution units, in accordance with one or more implementations of the invention. In various implementations, scheduler 304 may comprise a decoder 402, one or more issue queues 404 (e.g., type-A issue queue 404a, type-B issue queue 404b, . . . , type-N issue queue 404n), and/or one or more additional components. In some implementations, scheduler 304 may include multiple issue queues. For example, scheduler 304 may include n-number of issue queues 404 wherein "n" is any number greater than 1. In various implementations, crypto engine 122 may include a shared random number generator 408 that is utilized by each of the one or more crypto execution units 308 (e.g., crypto execution units 308a, 308b, . . . , 308n).

Scheduler 304 may be configured to interface with one or more crypto execution units. For example, scheduler 304 may be configured to interface with one or more crypto execution units 308 (308a, 308b, . . . , 308n). In various implementations, crypto engine 122 may comprise an array of crypto execution units, and scheduler 304 may be configured to coordinate the cryptographic operations performed by the array of crypto execution units. The array of crypto execution units may be formed by multiple crypto execution units 308 configured to operate in parallel. In other words, the array of crypto execution units may comprise multiple crypto execution units 308 (e.g., crypto execution units 308a, 308b, . . . , 308n) configured to execute cryptographic operations simultaneously.

In various implementations, scheduler 304 may comprise decoder 402 configured to analyze cryptographic algorithm parameters. Based on the analysis of the cryptographic algorithm parameters, decoder 402 may be configured to distribute cryptographic operations necessary to validate signatures for transactions among multiple crypto execution units (e.g., crypto execution units 308a, 308b, . . . , 308n).

In various implementations, scheduler 304 may be configured to access and/or maintain information indicating the capabilities of each of one or more one or more crypto execution units 308. Each crypto execution unit may comprise different capabilities. In some implementations, each of the crypto execution unit may be associated with one or more cryptographic operations. As such, the crypto execution units may be configurable for different decentralized applications. Scheduler 304 may be configured to access and/or maintain information indicating the configuration of the crypto execution units to which scheduler 304 is configured to interface with. For example, scheduler 304 may be configured to access and/or maintain a map of the crypto execution units to which scheduler 304 is configured to interface with comprising an indication of a type of crypto execution unit for each of the crypto execution units. For example, and referring to FIG. 4, each of crypto execution units 308a, 308b, and/or 308n may be a first type of crypto execution unit, a second type of crypto execution unit, and/or one or more other types of crypto execution units.

Based on the analysis by decoder 402, scheduler 304 may be configured to identify a given cryptographic operation to be performed that is necessary to validate a transaction. Based on the identified cryptographic operation and the information indicating the capabilities of each of one or more one or more crypto execution units 308, scheduler 304 may be configured to issue the cryptographic operations to a specific crypto execution unit 308 capable of performing the identified cryptographic operation.

In various implementations, scheduler 304 may be configured to access and/or maintain information indicating the status of each of one or more one or more crypto execution units 308. Based on the status of the one or more crypto execution units 308, scheduler 304 may be configured to load balance the cryptographic operations assigned to the one or more crypto execution units 308. For example, scheduler 304 may be configured to ensure that each crypto execution unit is assigned only a specified number (or threshold) of cryptographic operations at a given time and/or over a given time period. Accordingly, scheduler 304 may be configured to issue the cryptographic operations to a specific crypto execution unit 308 capable of performing the identified cryptographic operation based further on the number of cryptographic operations already issued to each of multiple crypto execution units.

In various implementations, distributing a given cryptographic operation to a crypto execution unit 308 may comprise placing the cryptographic operation in an issue queue. Crypto engine 122 may comprise multiple issue queues. Each issue queue may be associated with a single crypto execution unit 308 and/or a set of crypto execution units. For example, an issue queue may be associated with a set of crypto execution units of one or multiple types. For example, and referring to FIG. 4, scheduler 304 may be configured to insert a cryptographic operation to be performed into type-A issue queue 404a associated with crypto execution units of a first type, type-B issue queue 404b associated with crypto execution units of a second type, and/or one or more other issue queues associated with single crypto execution units and/or crypto executions of one or more other types. Each issue queue may comprise a SRAM-based data queue configured to hold transaction data for multiple transactions. For example, an issue queue may be configured to hold transaction data comprising a signature and the parameters. In some implementations, each issue queue may hold a transaction ID comprising 1 bit and an indication of the crypto execution type (16 bits) which may be required by crypto execution 308 to determine the cryptographic operation to be performed and the transaction associated with the cryptographic operation.

Once a cryptographic operation has been dispatched to a specific crypto execution unit 308, that crypto execution unit 308 may be configured to access the required information to perform the cryptographic operation from data buffer 306. For example, scheduler 304 may issue a command to a crypto execution unit 308 to perform a cryptographic operation, wherein command data for the command includes a transaction ID and an indication of the crypto execution type (or cryptographic operation to be performed). Based on the transaction ID and/or the indication of the crypto execution type, the crypto execution unit 308 may be configured to obtain data necessary to perform the cryptographic operation from data buffer 306. For example, crypto execution unit 308 may be configured to obtain the hash values, public keys and/or private keys, cryptographic algorithm parameters, and/or other data necessary to perform the cryptographic operation.

In some implementations, cryptographic operations may be dispatched by scheduler 304 to only a subset of the one or more crypto execution units 308. As such, one or more of a set of crypto execution units 308 may be idle at a given time while other crypto execution units 308 are performing cryptographic operations.

Referring back to FIG. 3, each of the one or more crypto execution units 308 may be associated with one or more cryptographic operations or one or more types of cryptographic operations. In other words, the one or more crypto execution units 308 may be configurable for different decentralized applications. For example, crypto execution unit 308a may be configured to perform a first cryptographic operation and crypto execution unit 308b may be configured to perform a second cryptographic operation. Accordingly, when operating in parallel, different cryptographic operations may performed simultaneously by different crypto execution units 308 configured to perform specific cryptographic operations.

In various implementations, each crypto execution unit 308 may be configured to support one or more of a set of macro operations required to authenticate one or more cryptographic signatures and verify a transaction in a decentralized application. For example, each crypto execution unit 308 may be configured to perform one or more of elliptic curve point multiplication; a SHA-1 hash function; modular addition, multiplication, and/or inversion; random number generation; and/or one or more other operations required to authenticate one or more cryptographic signatures and verify a transaction in a decentralized application.

Each crypto execution unit 308 may be configured to operate in parallel and perform one or more cryptographic operations required to verify the authenticity of transactions in a block. Because each of the crypto execution units may be associated with one or more cryptographic operations, the crypto execution units may be configurable for different decentralized applications. Accordingly, the implementation of each crypto execution unit 308 varies according to different elliptic curve parameters. Scheduler 304 is configured to issue specific cryptographic operations into the fitting crypto execution unit 308 based on the curve parameters associated with the required cryptographic operation, as described herein.

Figure 5:
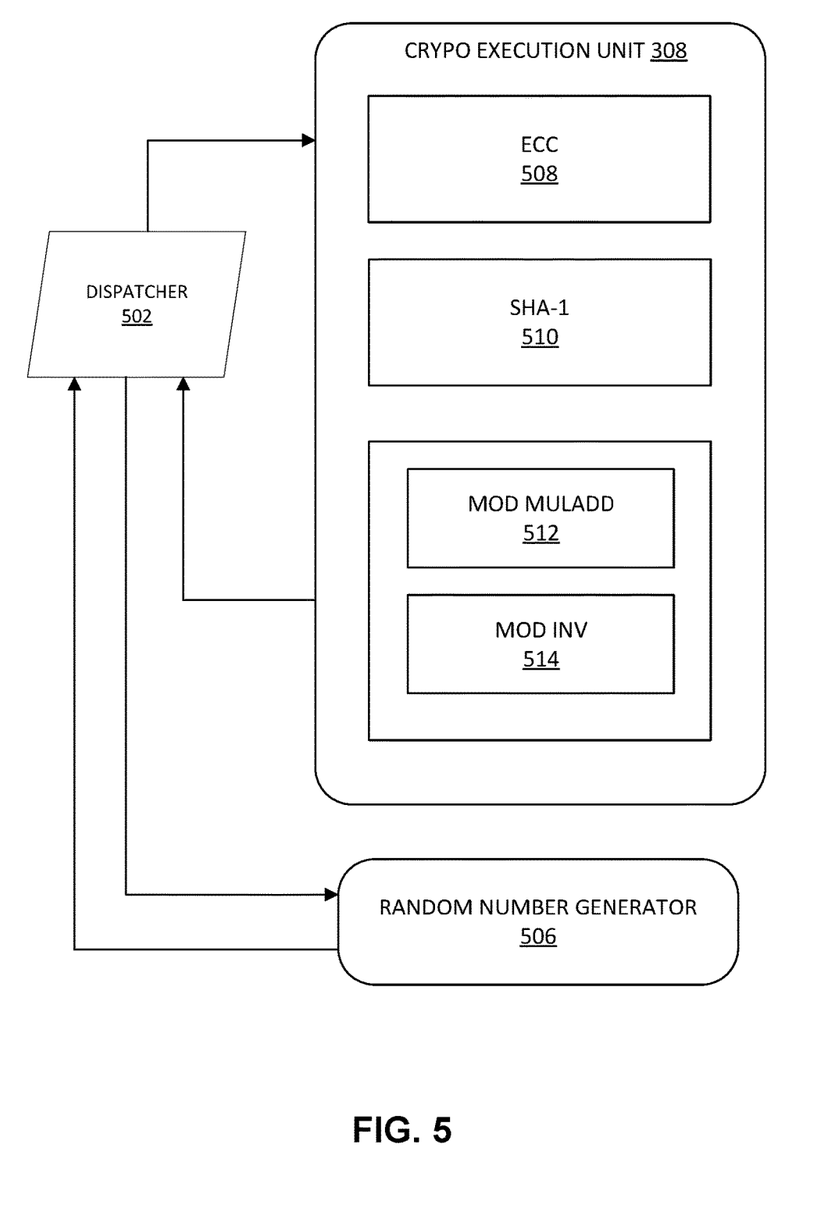
FIG. 5 illustrates a block diagram of an example of a single crypto execution unit in an array configured to operate in parallel and perform one or more cryptographic operations required to verify the authenticity of transactions in a block, in accordance with one or more implementations of the invention.

For example, FIG. 5 illustrates a block diagram of an example of a single crypto execution unit 308 configured to perform cryptographic operations related to the elliptic curve digital signature algorithm (ECDSA), in accordance with one or more implementations of the invention. Crypto execution unit 308 may comprise a single crypto execution unit of an array of crypto execution units in crypto engine 122. In the exemplary implementation depicted by FIG. 5, crypto execution unit 308 may comprise an elliptic curve point multiplication module 508, an SHA-1 hash function module 510, a multiplication/addition module 512, an inversion module 514, and/or one or more other modules configured to perform one or more tasks related to a given cryptographic operation.

FIG. 5 comprises a non-limiting example of a crypto execution unit 308. Each crypto execution unit 308 of crypto engine 122 may be of the same type or a different type of one or more of the other crypto execution units 308 of crypto engine 122. For example, the types of crypto execution units 308 included within crypto engine 122 may include ECDSA SECP256K1 encrypt, ECDSA SECP256R1 encrypt, RSA encrypt, ASE encrypt, ECDH encrypt, Zk-SNARKs encrypt, ECDSA SECP256K1 decrypt, ECDSA SECP256R1 decrypt, RSA decrypt, ASE decrypt, ECDH decrypt, Zk-SNARKs decrypt, and/or one or more other types of crypto execution units.

In various implementations, crypto engine 122 may comprise a dispatcher 502, a random number generator 506, and/or one or more additional components. In various implementations, dispatcher 502 may be configured to control the main dataflow for each crypto execution unit 308. For example, dispatcher 502 depicted in FIG. 5 may be configured to control the main dataflow for at least crypto execution unit 308 depicted in FIG. 5. Random number generator 502 may comprise a random number generator the same or similar to shared random number generator 408. Random number generator 502 may be shared among the crypto execution unit 308 depicted in FIG. 5 and one or more other crypto execution units. In various implementations, random number generator 502 may have a dedicated datapath to and from dispatcher 502.

Referring back to FIG. 3, each result of cryptographic operations performed by one of the one or more crypto execution units 308 may be temporarily stored in return data buffer 310. The time required to perform different cryptographic operations may vary. Accordingly, crypto execution units 308 may require different amounts of time to perform their assigned cryptographic operation. As such, in some implementations, the results from the cryptographic operations performed for a given block or set of transactions may be provided by crypto execution units 308 at different times. Accordingly, return data buffer 310 may be configured to temporarily store the results of cryptographic operations performed by crypto execution units 308 and reorder the results before the results are cached in signature validation result buffer 128.

In various implementations, return data buffer 310 may be software-managed. In some implementations, return data buffer 310 may be partitioned into different physical regions and each physical region may be associated with one or more different transactions. For example, each transaction may be assigned or associated with a specific transaction ID. Each partitioned physical region of return data buffer 310 may be associated with one or more specific transaction IDs. Based on the transaction ID assigned to a given transaction, return data buffer 310 may be configured to push back the return value of the results of the signature validation by crypto engine 122 to data/CMD interface 302 in a software-defined order. In some implementations, data/CMD interface 302 may be configured to cause the results of the signature validation by crypto engine 122 that are pushed back to be cached in signature validation result buffer 128. The partitioned nature of return data buffer 310 enables the results of the individual cryptographic operations performed by the one or more crypto execution units 308 to be easily accessed and ordered based on the transaction ID to facilitate transaction verification for the transaction associated with the transaction ID by system 100.

Exemplary Flowcharts of Processes

Figure 6:
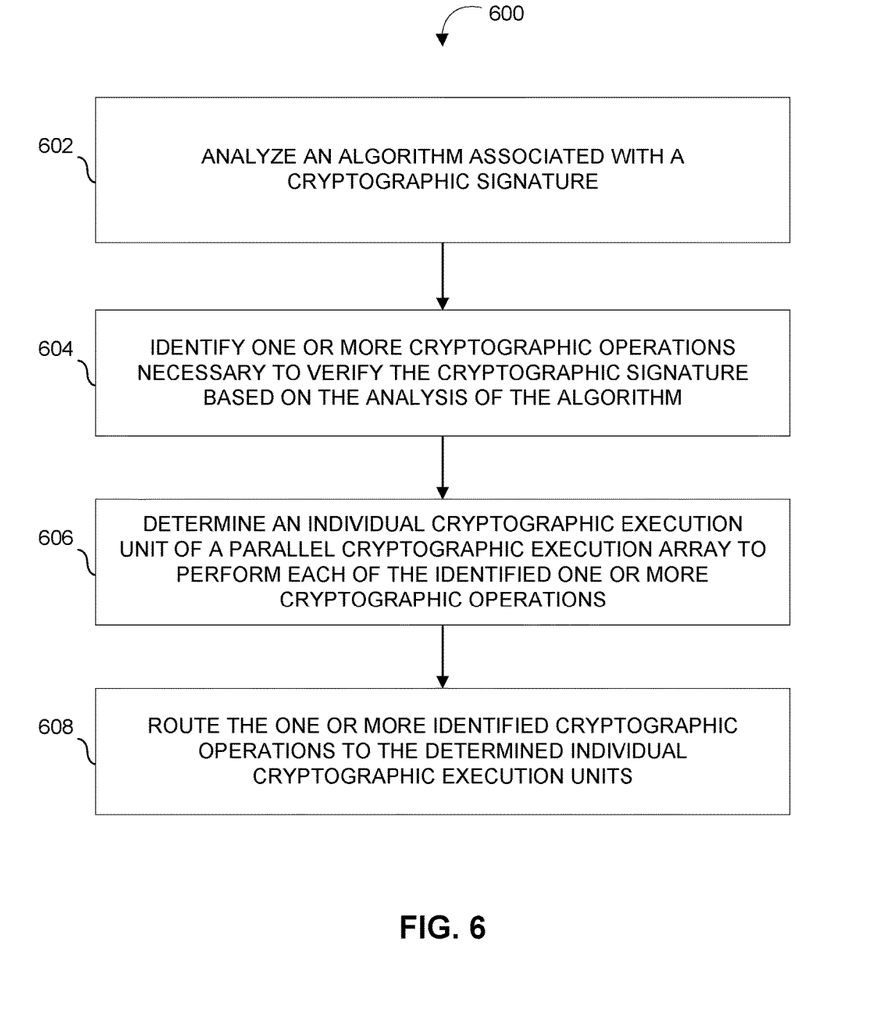
FIG. 6 depicts a flowchart of an example of a method for processing transaction verification operations in decentralized applications via a fixed pipeline hardware architecture, in accordance with one or more implementations of the invention.

FIG. 6 illustrates a method 600 for processing transaction verification operations in a decentralized application via a fixed pipeline hardware architecture, in accordance with one or more implementations of the invention. The operations of method 600 presented below are intended to be illustrative and, as such, should not be viewed as limiting. In some implementations, method 600 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 600 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

In some implementations, method 600 may be implemented via a hardware device configured to be communicatively coupled or physically attached to a component of a computer system. For example, method 600 may be implemented via the hardware device described above with respect to system 100. The hardware device described above with respect to system 100 may include one or more hardware components configured through firmware and/or software to be specifically designed for execution of one or more operations of method 600. In some implementations, method 600 may be implemented on an application specific integrated circuit (ASIC) or a field-programmable gate array (FPGA) specifically designed for execution of one or more operations of method 600. In various implementations, method 600 may be implemented on an application specific integrated circuit (ASIC) or a field-programmable gate array (FPGA) with a fixed pipeline hardware architecture comprising at least a parallel cryptographic execution array and a scheduler configured to coordinate cryptographic operations to be performed by the parallel cryptographic execution array. In various implementations, the application specific integrated circuit (ASIC) or field-programmable gate array (FPGA) may include a random number generator shared by each of a plurality of cryptographic execution units.

In an operation 602, method 600 may include analyzing an algorithm associated with a cryptographic signature. In an operation 604, method 600 may include identifying one or more cryptographic operations necessary to verify the cryptographic signature based on the analysis of the algorithm. In various implementations, the one or more cryptographic operations necessary to verify the cryptographic signature may be identified by determining algorithmic parameters of the algorithm and identifying the one or more cryptographic operations to be performed by the parallel cryptographic execution array based on the identified algorithmic parameters. In some implementations, the data related to a given transaction requiring signature verification may include hash values, public keys and/or private keys, and cryptographic algorithm parameters, and/or other data. However, only the cryptographic algorithm parameters may be required to identify the one or more cryptographic operations necessary to verify the cryptographic signature. Accordingly, the one or more cryptographic operations necessary to verify the cryptographic signature may be determined without hash values, public keys and/or private keys, and/or other data. The hash values, public keys and/or private keys, and/or other data may be cached in a data buffer (e.g., data buffer 306) until the one or more cryptographic operations necessary to verify the cryptographic signature are identified and routed to one or more cryptographic execution units (e.g., crypto execution units 308). In some implementations, operation 602 and operation 604 may be performed by a hardware component the same as or similar to crypto engine 122 (shown in FIG. 1 and FIG. 3 and described herein). Specifically, operation 602 and operation 604 may be performed by a hardware component the same as or similar to scheduler 304 of crypto engine 122 (shown in FIG. 3 and FIG. 4 and described herein).

In an operation 606, method 600 may include determining an individual cryptographic execution unit of the parallel cryptographic execution array to perform each of the identified one or more cryptographic operations. In various implementations, method 600 may be implemented via a hardware device comprising a parallel cryptographic execution array. The parallel cryptographic execution array may comprise a plurality of cryptographic execution units configured to operate in parallel. For example, the parallel cryptographic execution array may include at least a first cryptographic execution unit configured to perform at least a first set of cryptographic operations and a second cryptographic execution unit configured to perform at least a second set of cryptographic operations. In some implementations, the individual cryptographic execution unit to perform an identified cryptographic operation may be determined based on the capabilities of the plurality of cryptographic execution units in the parallel execution array. For example, information defining capabilities of each of the plurality of cryptographic execution units may be accessed. The information defining the capabilities may include an indication of the cryptographic operations each cryptographic execution unit is configured to perform. Based on the information defining the capabilities of the individual cryptographic execution units, cryptographic operations may be routed to certain cryptographic execution units based on a determination that it is capable of handling the cryptographic operation while others are not. In some implementations, the individual cryptographic execution unit to perform an identified cryptographic operation may be determined based on the status of each of the plurality of cryptographic execution units. For example, each cryptographic execution unit may only be assigned up to a threshold number of cryptographic operations. Based on a determination that the number of cryptographic operations assigned to a given cryptographic execution unit exceeds the threshold number of cryptographic operations to be performed, a cryptographic operation may be routed to a different cryptographic execution unit. In some implementations, operation 606 may be performed by a hardware component the same as or similar to crypto engine 122 (shown in FIG. 1 and FIG. 3 and described herein). Specifically, operation 606 may be performed by a hardware component the same as or similar to scheduler 304 of crypto engine 122 (shown in FIG. 3 and FIG. 4 and described herein).

In an operation 608, method 600 may include routing the one or more identified cryptographic operations to the determined individual cryptographic execution units. The individual cryptographic execution units may be configured to perform the one or more identified cryptographic operations based on data related to the cryptographic signature cached in a data buffer. Routing the one or more identified cryptographic operations to the determined individual cryptographic execution units may comprise placing information defining an identified cryptographic operation in an issue queue associated with the cryptographic execution unit that is to perform the cryptographic operation. In various implementations, the hardware device configured to implement method 600 may include a set of issue queues configured to cache information defining identified cryptographic operations to be performed by the parallel cryptographic execution array. Each issue queue is associated with one or more of the individual cryptographic execution units of the parallel cryptographic execution array. In various implementations, routing the one or more identified cryptographic operations to the determined individual cryptographic execution units may comprise outputting command data comprising a transaction ID and an indication of the type of cryptographic operation to be performed. The individual cryptographic execution unit to perform a given cryptographic operation may obtain data necessary to perform the identified cryptographic operation that is cached in a data buffer based at least on the transaction ID for the identified cryptographic operation. In some implementations, operation 608 may be performed by a hardware component the same as or similar to crypto engine 122 (shown in FIG. 1 and FIG. 3 and described herein).

In various implementations, method 600 may further include verifying whether a cryptographic signature is valid based on the cryptographic operations performed by the parallel cryptographic execution array.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although illustrated in FIG. 1 as a single component, system 100 may include a plurality of individual components (e.g., computer devices) each programmed with at least some of the functions described herein. In this manner, some components of system 100 may perform some functions while other components may perform other functions, as would be appreciated.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to perform cryptographic signature verification utilizing a fixed pipeline hardware architecture comprising a set of hardware components, the hardware components including at least a parallel cryptographic execution array and a scheduler, the system comprising:

the parallel cryptographic execution array comprising a plurality of cryptographic execution units, wherein the plurality of cryptographic execution units are configured to operate in parallel and include at least a first cryptographic execution unit configured to perform at least a first set of cryptographic operations and a second cryptographic execution unit configured to perform at least a second set of cryptographic operations; and the scheduler configured to analyze an algorithm associated with a cryptographic signature, identify multiple cryptographic operations necessary to verify the cryptographic signature based on the analysis of the algorithm, and route the identified cryptographic operations to individual cryptographic execution units of the parallel cryptographic execution array, wherein the identified cryptographic operations include encrypt operations and/or decrypt operations, and wherein to route one of the identified cryptographic operations to an individual cryptographic execution unit of the parallel cryptographic execution array, the scheduler is configured to output command data comprising a transaction ID and an indication of the type of cryptographic operation to be performed.

2. The system of claim 1, wherein the identified cryptographic operations include at least a first cryptographic operation, wherein to route the first cryptographic operation to at least one of the individual cryptographic execution units of the parallel cryptographic execution array, the scheduler is configured to:
   access information defining capabilities of each of the plurality of cryptographic execution units, wherein the information includes an indication that the first cryptographic execution unit is configured to perform at least the first set of cryptographic operations and an indication that the second cryptographic execution unit is configured to perform at least the second set of cryptographic operations;
   determine that the first set of cryptographic operations includes the identified first cryptographic operation and that the second set of cryptographic operations does not include the identified first cryptographic operation; and
   route the first cryptographic operation to the first cryptographic execution unit based at least on the determination that the first set of cryptographic operations includes the identified first cryptographic operation.

3. The system of claim 2, wherein the system further comprises:
   a set of issue queues configured to cache information defining identified cryptographic operations to be performed by the parallel cryptographic execution array, wherein each issue queue is associated with one or more of the individual cryptographic execution units of the parallel cryptographic execution array, the set of issue queues including at least a first issue queue associated with the first cryptographic execution unit and a second issue queue associated with the second cryptographic execution unit;
   wherein to route the first cryptographic operation to the first cryptographic execution unit, the scheduler is configured to place information defining the first cryptographic operation in the first issue queue.

4. The system of claim 2, wherein the identified cryptographic operations include at least a second cryptographic operation, wherein to route the second cryptographic operation to at least one of the individual cryptographic execution units of the parallel cryptographic execution array, the scheduler is configured to:
   determine a status of each of the plurality of cryptographic execution units, wherein the status indicates a number of cryptographic operations to be performed by each of the plurality of cryptographic execution units;
   determine that the number of cryptographic operations to be performed by the first cryptographic execution unit exceeds a threshold number of cryptographic operations to be performed; and
   route the second cryptographic operation to the second cryptographic execution unit based at least on the determination that the number of cryptographic operations to be performed by the first cryptographic execution unit exceeds the threshold number of cryptographic operations to be performed.

5. The system of claim 1, wherein the system further comprises:
   a random number generator shared by each of the plurality of cryptographic execution units.

6. The system of claim 1, wherein to identify the multiple cryptographic operations necessary to verify the cryptographic signature based on the analysis of the algorithm, the scheduler is further configured to:
   determine algorithmic parameters of the algorithm; and
   identify the multiple cryptographic operations to be performed by the parallel cryptographic execution array based on the identified algorithmic parameters.

7. The system of claim 6, wherein the system is configured to verify whether the cryptographic signature is valid based on the cryptographic operations performed by the parallel cryptographic execution array.

8. The system of claim 1, wherein to perform an identified cryptographic operation for a given transaction, the individual cryptographic execution unit is configured to:
   obtain data necessary to perform the identified cryptographic operation cached in a data buffer based at least on the transaction ID.

9. The system of claim 1, wherein the system comprises an application specific integrated circuit (ASIC) or a field-programmable gate array (FPGA).

10. A method of performing cryptographic signature verification utilizing a fixed pipeline hardware architecture comprising a set of hardware components, the hardware components including at least a parallel cryptographic execution array and a scheduler, the method comprising:
    analyzing an algorithm associated with a cryptographic signature;
    identifying multiple cryptographic operations necessary to verify the cryptographic signature based on the analysis of the algorithm, wherein the identified cryptographic operations include encrypt operations and/or decrypt operations;
    determining an individual cryptographic execution unit of the parallel cryptographic execution array to perform each of the identified cryptographic operations, wherein the parallel cryptographic execution array comprises a plurality of cryptographic execution units configured to operate in parallel and includes at least a first cryptographic execution unit configured to perform at least a first set of cryptographic operations and a second cryptographic execution unit configured to perform at least a second set of cryptographic operations; and
    routing the identified cryptographic operations to the determined individual cryptographic execution units, wherein routing the identified cryptographic operations to the determined individual cryptographic execution units comprises outputting command data comprising a transaction ID and an indication of the type of cryptographic operation to be performed, and wherein the determined individual cryptographic execution units are configured to perform the identified cryptographic operations based on data related to the cryptographic signature cached in a data buffer.

11. The method of claim 10, wherein the identified cryptographic operations include at least a first cryptographic operation, wherein determining the individual cryptographic execution unit to perform the first cryptographic operation comprises:
    accessing information defining capabilities of each of the plurality of cryptographic execution units, wherein the information includes an indication that the first cryptographic execution unit is configured to perform at least the first set of cryptographic operations and an indication that the second cryptographic execution unit is configured to perform at least the second set of cryptographic operations; and determining that the first set of cryptographic operations includes the identified first cryptographic operation and that the second set of cryptographic operations does not include the identified first cryptographic operation, wherein the first cryptographic operation is routed to the first cryptographic execution unit based at least on the determination that the first set of cryptographic operations includes the identified first cryptographic operation.

12. The method of claim 11, wherein routing the first cryptographic operation to the first cryptographic execution unit comprises:

placing information defining the first cryptographic operation in a first issue queue of a set of issue queues, wherein the set of issue queues are configured to cache information defining identified cryptographic operations to be performed by the parallel cryptographic execution array, wherein each issue queue is associated with one or more of the individual cryptographic execution units of the parallel cryptographic execution array, the set of issue queues including at least the first issue queue associated with the first cryptographic execution unit and a second issue queue associated with the second cryptographic execution unit.

13. The method of claim 11, wherein the identified cryptographic operations include at least a second cryptographic operation, wherein determining the individual cryptographic execution unit to perform the second cryptographic operation comprises:

determining a status of each of the plurality of cryptographic execution units, wherein the status indicates a number of cryptographic operations to be performed by each of the plurality of cryptographic execution units;

determining that the number of cryptographic operations to be performed by the first cryptographic execution unit exceeds a threshold number of cryptographic operations to be performed, wherein the second cryptographic operation is routed to the second cryptographic execution unit based at least on the determination that the number of cryptographic operations to be performed by the first cryptographic execution unit exceeds the threshold number of cryptographic operations to be performed.

14. The method of claim 10, wherein identifying the multiple cryptographic operations necessary to verify the cryptographic signature based on the analysis of the algorithm comprises:

determining algorithmic parameters of the algorithm; and identifying the multiple cryptographic operations to be performed by the parallel cryptographic execution array based on the identified algorithmic parameters.

15. The method of claim 14, the method further comprising:

verifying whether the cryptographic signature is valid based on the cryptographic operations performed by the parallel cryptographic execution array.

16. The method of claim 10, the method further comprising:

obtaining, by an individual cryptographic execution unit, data necessary to perform the identified cryptographic operation cached in a data buffer based at least on the transaction ID; and performing, by the individual cryptographic execution unit, the identified cryptographic operation for based at least in part on the data obtained from the data buffer.

17. The method of claim 10, wherein the method is implemented on an application specific integrated circuit (ASIC) or a field-programmable gate array (FPGA).

18. The method of claim 17, wherein the application specific integrated circuit (ASIC) or the field-programmable gate array (FPGA) includes a random number generator shared by each of the plurality of cryptographic execution units.

19. A system configured to perform cryptographic signature verification utilizing a fixed pipeline hardware architecture comprising a set of hardware components, the hardware components including at least a parallel cryptographic execution array, a random number generator, and a scheduler, the system comprising:

the parallel cryptographic execution array comprising a plurality of cryptographic execution units, wherein the plurality of cryptographic execution units are configured to operate in parallel and include at least a first cryptographic execution unit configured to perform at least a first set of cryptographic operations and a second cryptographic execution unit configured to perform at least a second set of cryptographic operations, and wherein the random number generator is shared by each of the plurality of cryptographic execution units; and the scheduler configured to analyze an algorithm associated with a cryptographic signature, identify multiple cryptographic operations necessary to verify the cryptographic signature based on the analysis of the algorithm, and route the identified cryptographic operations to individual cryptographic execution units of the parallel cryptographic execution array, wherein the identified cryptographic operations include encrypt operations and/or decrypt operations.

* * * * *